United States Patent [19]
Crutchfield

[11] 3,942,720
[45] Mar. 9, 1976

[54] METHOD AND APPARATUS FOR CONTROLLING THE MOVEMENT OF A VEHICLE ALONG A PRESCRIBED PATH

[76] Inventor: Billie M. Crutchfield, 1205 Kings Cross Road, Blue Springs, Mo. 64015

[22] Filed: Feb. 24, 1975

[21] Appl. No.: 552,187

Related U.S. Application Data

[63] Continuation of Ser. No. 277,173, Aug. 2, 1972, abandoned.

[52] U.S. Cl. .................. 238/4; 104/135; 104/166; 193/35 R; 238/10 R
[51] Int. Cl.² ...................................... E01B 25/00
[58] Field of Search............ 238/2, 3, 4, 10 R, 10 C; 193/1, 35 R, 35 C, 38; 104/242, 243, 245, 247, 134, 135, 166; 214/16.1 R, 16.1 C, 16.1 D, 16.1 E; 404/1, 34

[56] References Cited
UNITED STATES PATENTS

| | | | |
|---|---|---|---|
| 2,085,329 | 6/1937 | Porte | 238/4 |
| 2,846,088 | 8/1958 | Porter | 214/16.1 C |
| 3,042,309 | 7/1962 | Smith et al. | 238/4 |
| 3,218,991 | 11/1965 | Wehner | 238/10 R X |
| 3,371,620 | 3/1968 | Furukawa | 214/16.1 R X |
| 3,467,310 | 9/1969 | Fraser | 238/4 |

FOREIGN PATENTS OR APPLICATIONS

| | | | |
|---|---|---|---|
| 1,158,090 | 11/1963 | Germany | 238/4 |
| 1,176,344 | 8/1964 | Germany | 214/16.1 R |

*Primary Examiner*—Evon C. Blunk
*Assistant Examiner*—James L. Rowland
*Attorney, Agent, or Firm*—Lowe, Kokjer, Kircher

[57] ABSTRACT

A vehicle path controller has a plurality of cylindrical support rollers arranged in section(s) with each roller axis (of rotation) substantially parallel to and along the prescribed path. An entrance ramp is positioned adjacent the initial roller section and facilitates the driving of the vehicle onto same. The rollers are rotatably connected to framework and are conveniently arranged in two separate paths, one path for the left wheels and one path for the right wheels. Guide rollers are also connected to the framework but have an axis of rotation elevated with reference to the vehicle support rollers.

The method of controlling the movement of a vehicle along a prescribed path comprises the steps of:
  moving a vehicle on said prescribed path having a plurality of rollers supporting substantially the weight of the vehicle,
  guiding the advancing end of the vehicle on said roller path, and
  laterally shifting the trailing end of the vehicle on said roller path to maintain said vehicle movement along a prescribed path.

3 Claims, 6 Drawing Figures

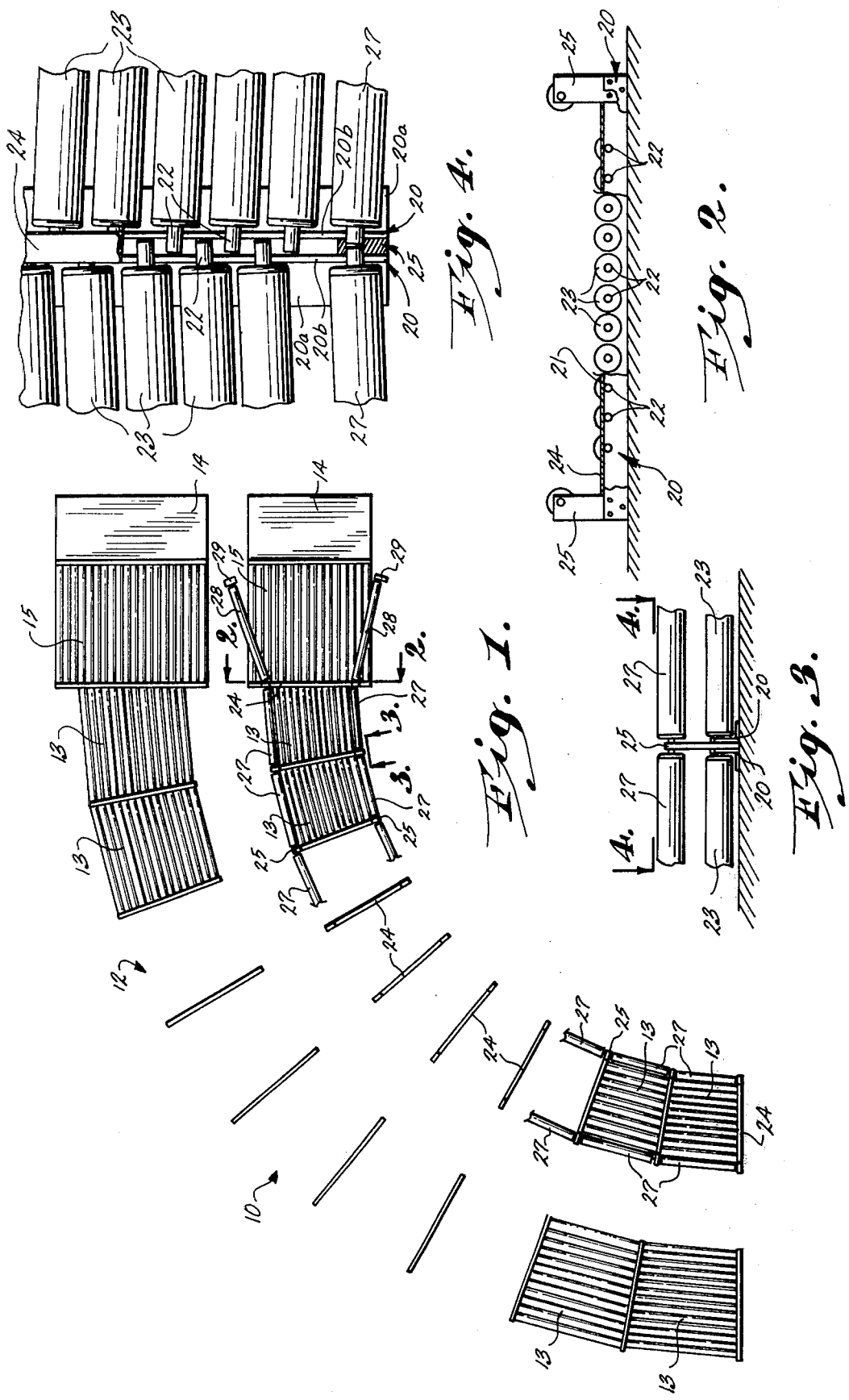

METHOD AND APPARATUS FOR CONTROLLING THE MOVEMENT OF A VEHICLE ALONG A PRESCRIBED PATH

This is a continuation of application Ser. No. 277,173, filed Aug. 2, 1972, and now abandoned.

BACKGROUND AND BRIEF DESCRIPTION OF THE INVENTION

The use of apparatus to control vehicles along a prescribed path is an art recognized concept. Sometimes apparatus of this nature controls automobile movement to enable same to be worked on such as in automatic car washes. Other types of apparatus have a support surface for the automobile tires with guide rails along the peripheral edges of the supports to define the prescribed path. These path controllers are conventionally used with grease racks and trucker's ramps to facilitate the loading and unloading of automobiles from automobile transport trailers. While the above mentioned guides did tend to direct the vehicle, they could not maintain the vehicle within the desired path since the vehicle tires could obtain sufficient traction to climb over the guides and escape therefrom. Often a vehicle is damaged as a result of such a procedure. Further, the support surface of the ramp or tracks were immobile relative to the guides therefore virtually precluding that the ramp or track path could have a radius or curvature less than the turning radius of the vehicle being moved along the path. Accordingly such apparatus could not facilitate the accomplishment of a sharper turn by an automobile than could be conventionally accomplished by the automobile steering mechanisms.

The present invention relates to a method and apparatus for controlling the path of a vehicle. The prescribed path is generally constructed of an entrance ramp and at least one section for each of the advancing wheels, the sections being comprised of a plurality of support rollers. Each of the support rollers will have its axis of rotation substantially parallel to the path and rotatably connected to framework thereby providing an elevated support for the rollers. The framework further serves as a means for mounting guide rollers on the peripheral side portions of the section(s) immediately adjacent the direction of the turn. Stated another way, if the vehicle is negotiating a left hand curve, the left hand section will be provided with the guide rollers on either side thereof. In any event, the guide rollers will be elevated above the support rollers and will likewise have their axis of rotation substantially parallel to the desired path.

It is contemplated that a plurality of sections may be combined to define various curves and tortuous paths. In fact, each section may be considered to be a vehicle correlator as the first section meeting the advancing portion of the vehicle acting to essentially "capture" the vehicle and begins the turning process. As the trailing two wheels eventually move on the initial section, the guide rollers operate to preclude the advancing wheels from inadvertently leaving the desired path and the support rollers will then effect a lateral shifting of the trailing end of the vehicle so as to coordinate the turning of the vehicle and to direct same along the path behind the front wheels.

One of the principal objects of the invention is to provide a unique method and apparatus for moving a vehicle along a prescribed path. It is a feature of the invention that the method and apparatus provide for the lateral shifting of at least the trailing end of the vehicle as it is moved along the path.

Another object of the invention is to provide a uniquely constructed correlator and turn coordinator which enables vehicles to by-pass obstacles and to make optimum use of limited space.

A further object of the invention is to provide a correlator and turn coordinator of the character described which utilizes rollers as a support surface for a vehicle riding thereon and providing its own motive force, said rollers operable to effect the lateral shifting and controlled vehicle turning within a prescribed arcuate path.

A further object of the invention is to provide a uniquely constructed correlator and turn coordinator of the character described which includes the utilization of novel guide rollers. It is a feature of this object that the guide roller(s) operates to maintain the vehicle within the bounds of the prescribed path and can actually eliminate need to manually steer the vehicle once same is "captured" by the correlator section.

Another object of the invention is to provide a vehicle correlator and turn coordinator that is comprised of a plurality of sections having various lengths therein. It is a feature of the object that the sections may be oriented in a number of ways to permit the vehicle riding thereon to negotiate a tortuous path, including 90° turns, in significantly less space than has been heretofore required. Accordingly, a salient feature of the invention is to maximize the utilization of expensive real estate ordinarily associated with car washes, drive-in banks, tractor-trailer loading zones, and any other areas where tight vehicle maneuverability is required on limited space.

Another extremely important object of the invention is to provide a rugged, inexpensive, and easy to install vehicle correlator and turn coordinator. A very important feature of this object is that the manufacture and assembly of the portions comprising the correlator and turn coordinator are simplified in order to keep maintenance and repairs at a minimum.

These and other objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views:

FIG. 1 is a plan view of an arrangement of the present invention;

FIG. 2 is an end elevational view taken generally along the line 2—2 of FIG. 1 in the direction of the arrows and with a portion of the framework broken away to more clearly illustrate the roller mounting technique;

FIG. 3 is a side elevational view taken generally along the line 3—3 of FIG. 1 in the direction of the arrows;

FIg. 4 is an enlarged partial plan view taken generally along the line 4—4 of FIG. 3 in the direction of the arrows;

Figure 6:
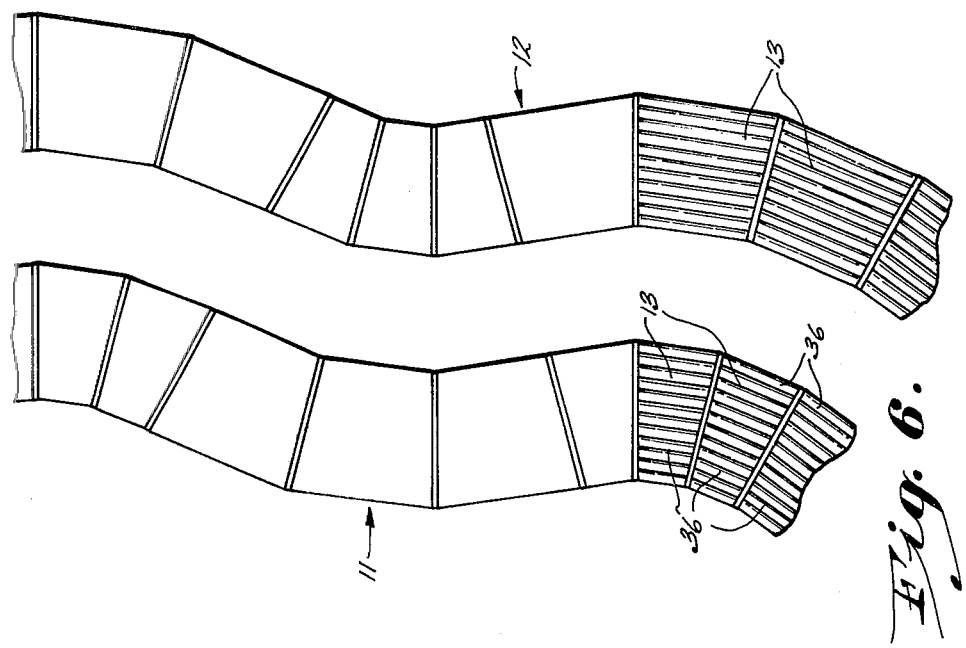
FIG. 6 is still another arrangement making use of the subject invention to facilitate the vehicle negotiation of a tortuous path.

Referring now more particularly to FIGS. 1–4, the turn coordinator is generally depicted by the numeral 10. As shown in FIG. 1, this turn coordinator provides a path for a 90° left hand turn from the vehicle lubber line entering same. Actually, the turn coordinator will include a left portion 11 and a right portion 12 which are substantially parallel to each other and follow the prescribed path. It should be pointed out that while the turn coordinator is shown as being comprised of two separate portions (11 and 12), the entire width of the path could be constructed without the center median although guide rollers (described infra) would still be needed.

As suggested above, the turn coordinator is constructed from a plurality of sections 13. These sections may be thought of as individual turn correlators in that a pair of sections (left and right) serve to capture an incoming vehicle. For example, a section of slightly different construction is shown in communicating relationship with the entrance ramps 14. In section 15, the roller lengths will be substantially equal and curvilinear motion will be imparted to the vehicle. However, it is contemplated that the rollers in correlator sections 13 will be constructed of predetermined but varying length so that a particular increment of the curve is provided by each pair of sections. As illustrated in FIG. 1, sections 13 are constructed of such a length and angulation that a 10° arc is negotiated each time the vehicle passes a particular section.

As suggested, the sections 13 do not begin to approximate the curvilinear path until the vehicle has entered into the first capture sections indicated by the numeral 15. These capture sections will be adjacent the exiting portion of ramps 14 on both the left and right portions. The capture sections begin the original locating and correlating of the approaching vehicle so that the roller sections 13 may then substantially take over the steering and shifting of the vehicle as its advancing end portion is accepted and moved thereon. Also, since the left coordinator portion 11 is inside the radius or curvature of the illustrated prescribed path, the sections 13 of correlator portion 12 are larger than the corresponding section 13 of portion 11.

Turning now more particularly to the construction of the correlator sections, it may be clearly seen in FIGS. 2, 3 and 4 that the rollers 23 which comprise a supporting portion of each correlator section, are supported on angle framework structurals generally designated by a numeral 20. Each angle which comprises the roller supporting framework will seat on ground level on its lower horizontal flange 20a with its vertical web 20b is spaced apart relationship with the next occurring angle structural 20. As shown in FIG. 2, the vertical web of each angle will be appropriately notched or slotted at 21 and will accommodate one end portion a corresponding roller shaft 22 of support roller 23. For convenience of assembly and to eliminate excessive spacing between the correlator sections, notches 21 in the adjacent angle supports 20 will be staggered so that the roller shafts in the succeeding section will substantially interleave (as seen from above) with the roller shafts of the preceding section (note FIG. 4).

The construction of rollers 23 may be tubular steel rotatively mounted on the roller shafts 22 by nylon bushings or bearings located adjacent each roller end portion. These rollers, hereinafter identified by the numeral 23, may be easily laid in place between the vertical webs 20b of the corresponding angles of framework 20. A flat plate 24 may then be placed over the upper surfaces of the vertical adjacent webs 20b to preclude the roller shafts from bouncing out of the slots or notches 21. With this construction, a damaged roller may be easily replaced by simply removing the plate 24 at each end of the roller and lifting the roller out of its normally operative position within the framework.

As suggested above, the turn coordinator portion with the inside radius or curvature (the left portion 11 shown in FIG. 1) will have guide rollers defining the boundary limits of the prescribed path. These guide rollers will be supported on each side of each section 13 of the coordinator portion 11 by the flat, vertically oriented, metal guide mount 25 that is bolted or otherwise connected between the adjacent vertical web portions 20b. As shown in FIGS. 2 and 3, the guide mounts extend substantially above the upper surface of the support rollers 23 and are provided at the upper portion thereof with a suitable apperture and/or slot to accept the roller shaft 26 of a guide roller 27. In a similar manner, the guide rollers 28 (FIG. 1) are supported above the upper surface of the support rollers in the capture section 15 and are flared outwardly therefrom to facilitate the driving of the advancing end portion of the vehicle tire therein. Guide roller 28 will be supported between the first guide mount 25 adjacent the entry to the first section 13 of the left hand portion 11. The flared end portions of the guide rollers 28 will have guide mounts 29 (of similar construction to mount 25) supported from the ground level however properly elevating guide roller 28 for utilization with the capture section 15. This guide mount (29) likewise is suitably apperture and slotted to accept the flared guide roller shaft.

The above described description illustrates how a plurality of sections, having rollers of proper lengths, may be interrelated to define a curved path and how the rollers are supported above the ground level for free rotation so that both the guide rollers 27 and the support rollers 23 are free to rotate on their bearings about their substantially stationary axes. In the same manner, the flared entrance guide rollers 28 will freely rotate for the purpose of guiding the advancing vehicle tires into the proper path. As will be explained in more detail, the guide rollers preclude the vehicle (if not steered) from climbing over the guide roller level. At the same time, the advancing and trailing wheels of the vehicle will experience a lateral shift due to the rotative presence of the support rollers 23 in both the left and right hand turn track portion 11 and 12. Further, the angle framework 20 provides a rugged, easy to manufacture and simple to assemble support for the rollers requiring only a minimum of advanced planning as to the size of the curve and related roller lengths.

Figure 5:
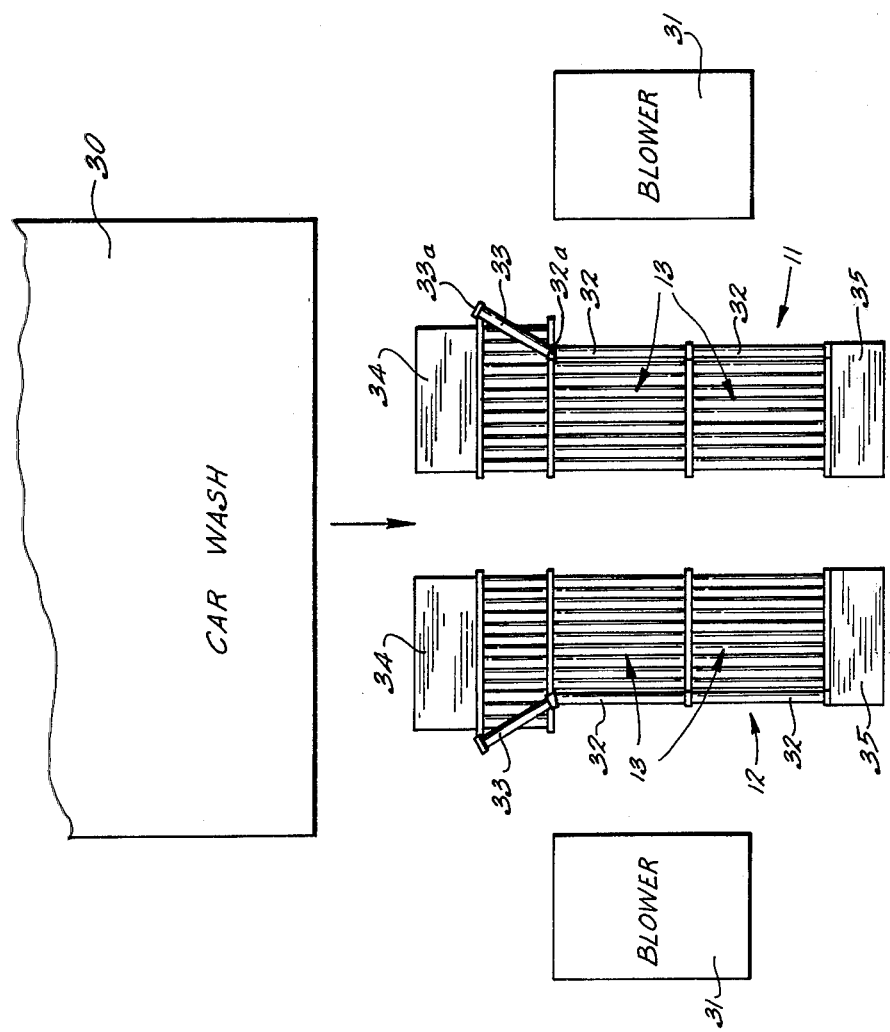
FIG. 5 is a top plan view of another arrangement utilizing the present invention as a means to control the path of the vehicle exiting from a car wash.

Turning now to the additional embodiments shown in FIGS. 5 and 6, it should be stressed that the uniquely constructed correlator sections are utilizable to describe preselected automobile paths other than the 90° turn shown in FIG. 1. For example, the coordinator shown in FIG. 5 is positioned adjacent the exit end of a car wash 30. In this particular embodiment, the car wash will have blowers 31 on each side of the exit end to facilitate in the drying of the automobile as it leaves the car wash. In order to eliminate what seems to be a natural tendency to turn an automobile too tightly and run into blowers 31, the vehicle path coordinator in FIG. 5 is shown as being comprised of at least two sections 13 for both the left and right path portions 11 and 12 respectively. In this embodiment, there is no need for the rollers in the right hand path portion 12 to be longer than the rollers in the left path portion however, the guide rollers, hereinafter identified by the numeral 32 may be located on either the outer peripheral side portions of each section instead of being only on one (either right or left) path portion as described with respect to FIGS. 1–4.

As suggested above, the roller sections are constructed substantially identical to the section discussed with respect to FIGS. 1–4 and will include the support frame angles (not shown), guide mounts 32a, and the flared entrance rollers 33 and their associated mounts 33a adjacent the ramps 34. Also, with this structure, an exit ramp 35 will be in communicating relationship with the end extremity of the support sections so that the vehicle may proceed with the turn only after the blowers have been cleared by the vehicle thereby insuring that same will negotiate the path between the blowers without a possible injury to either.

In certain instances, a vehicle (more than likely a delivery truck) needs to negotiate a tortuous path around building corners or other obstacles and to be able to back through narrow, crowded city blocks and alleys. The embodiment shown in FIG. 6 facilitates the movement of a vehicle along such a path thereby making certain loading docks, pick up and delivery stations, and counter tops accessible to larger contemporary vehicles for the first time. Again, the coordinator is comprised of a plurality of sections 13 with parallel left and right paths 11 and 12 defining the route to be taken by the vehicle. It is contemplated that the guide rollers 36 will again be located on the left hand path but could conceivably be mounted on either path depending upon the more convenient assembly. Further, the support rollers 23 will be substantially identical in structure and operation, the only difference being in the fact that certain rollers must have a prescribed length in order to create the arcuate vehicle path movement. In this instance, entrance and exit ramps will be available for elevating or lowering the vehicle on the support surfaces of the rollers as will be needed.

In operation, the subject method and apparatus first requires that the selection of the path be made. For example, service station car washes have become quite popular and are generally located on extremely valuable real estate at intersections or close to busy highways and streets. In order to add a car wash facility to an existing service station, it is sometimes necessary that an automobile make a 90° turn to enter the automatic car wash facility. Also, lesser turns must sometimes be made within a limited space in order to efficiently utilize existing facilities and this limited space could, without the subject invention, make the addition of a car wash facility totally impossible. In any event, after the path selection has been made, the turn coordinator is laid along the path with the left and right coordinator portions 11 and 12 being in a substantially parallel relationship. Quite obviously, entrance ramps to each path portion will be provided for easy access to the supporting surface thereof. In any event, the initial roller support section with the flared guide rollers acts to capture the advancing end of the vehicle. This, in effect, positions the vehicle on the path and further vehicle movement by its own power and will result in the guiding of the vehicle even though the driver does not steer the vehicle at all.

The previous description has generally indicated that the guide rollers 27 (27 in FIG. 1–4) are mounted on the left side of the path portion along each longitudinal edge of the roller support section. As the advancing end of the vehicle contacts a guide roller with one of its wheels, the guide roller will rotate about its axis of rotation and will preclude the advancing vehicle from "climbing" over the guide rail portion. At the same time, the support rollers will effect the lateral shifting of the vehicle both at the advancing wheels and at the trailing wheels when on the support rollers. Since the support rollers permit the shifting of the rear or trailing end of the vehicle in a direction transverse to the axis of rotation thereof, the rear end follows the front end of the vehicle along a path that may have a significantly shorter radius of curvature than that of the vehicle's normal turn.

The size of the framework and the length of the rollers are selected so that the vehicle will travel over a prescribed increment of the path. This increment will be determined by factors such as the weight of the vehicle or the load to be carried by the framework, the radius or curvature through which the vehicle is moved, the width and length of the vehicle, and the space limitations in which the vehicle is being moved. In determining the distance between the left coordinator portion 11 and the right coordinator portion 12, the variations in the track width of different types of vehicles travelling over the prescribed path and the radius of curvature will be considered. Further, the rollers used for guiding the vehicle through the path may have been optimum height above the support rollers. If it is contemplated that very heavy trucks must negotiate a particular path, the guide rollers will be placed somewhat higher than would be the normal location for most passenger automobile vehicles. However, in any case, when the vehicle tire or wheel attempts to "climb" the guides, the rollers will roll and will not provide sufficient support or a frictional track to permit the tires of the vehicle to climb over same.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. Apparatus for guiding a wheeled vehicle capable of negotiating a turn having a predetermined maximum curvature, said apparatus comprising:
   a plurality of roller sections, each having substantially parallel support rollers of diverse lengths rotatably mounted generally side by side and in a staggered longitudinal relationship to support the vehicle and permit lateral shifting thereof, each roller section defining a width greater than the width of the vehicle;
   means for mounting said roller sections end to end with the support rollers of adjacent sections angled relative to one another to define a curved path having a greater curvature than said predetermined maximum curvature, said support rollers extending generally longitudinally along said curved path and chordally relative thereto; and raised guide rail means elevated with respect to said support rollers and extending along at least one longitudinal edge of said curved path to retain the vehicle thereon.

2. Apparatus as set forth in claim 1, wherein said guide rail means comprises a plurality of guide rollers positioned end to end and supported for rotation about axes oriented substantially chordally relative to said curved path.

3. Apparatus as set forth in claim 1, including a shaft carrying each support roller thereon and a bracket disposed at the end of each roller section for supporting said shafts, each of said brackets being adopted to rest on a supporting surface and having an upstanding portion supportively receiving said shafts to mount said support rollers a spaced distance above said surface for free rotation about the axes of said shafts.

* * * * *